(12) United States Patent
Bansal et al.

(10) Patent No.: US 10,789,575 B2
(45) Date of Patent: Sep. 29, 2020

(54) USER INTERFACE FOR TIMESHEET REPORTING

(71) Applicant: ServiceNow, Inc., Santa Clara, CA (US)

(72) Inventors: Pradeep Bansal, Foster City, CA (US); Scott Fuller, Woodinville, WA (US); Balaji Cuttackham, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 145 days.

(21) Appl. No.: 15/587,940

(22) Filed: May 5, 2017

(65) Prior Publication Data
US 2018/0322468 A1  Nov. 8, 2018

(51) Int. Cl.
*G06Q 10/10* (2012.01)
*G06F 3/048* (2013.01)
*G06Q 10/06* (2012.01)

(52) U.S. Cl.
CPC ......... *G06Q 10/1091* (2013.01); *G06F 3/048* (2013.01); *G06Q 10/06* (2013.01)

(58) Field of Classification Search
CPC .. G06Q 10/1091; G06F 3/0482; G06F 3/0484
USPC .......................................................... 705/32
See application file for complete search history.

(56) References Cited

U.S. PATENT DOCUMENTS

| | | | | |
|---|---|---|---|---|
| 5,193,178 A | * | 3/1993 | Chillarege | G06F 11/366 714/25 |
| 5,555,364 A | * | 9/1996 | Goldstein | G06Q 10/109 705/32 |
| 6,073,108 A | * | 6/2000 | Peterson | G06Q 10/06311 705/30 |
| 6,609,122 B1 | | 8/2003 | Ensor | |
| 6,832,176 B2 | * | 12/2004 | Hartigan | G07C 1/00 702/178 |
| 7,028,301 B2 | | 4/2006 | Ding | |
| 7,131,037 B1 | | 10/2006 | LeFaive | |
| 7,170,864 B2 | | 1/2007 | Matharu | |
| 7,350,209 B2 | | 3/2008 | Shum | |
| 7,568,003 B2 | * | 7/2009 | Zhang | G06F 17/3089 709/201 |
| 7,610,512 B2 | | 10/2009 | Gerber | |
| 7,617,073 B2 | | 11/2009 | Trinon | |
| 7,640,548 B1 | * | 12/2009 | Yu | G06Q 10/10 718/106 |
| 7,689,628 B2 | | 3/2010 | Garg | |

(Continued)

*Primary Examiner* — Florian M Zeender
*Assistant Examiner* — Nicole Elena Bruner
(74) *Attorney, Agent, or Firm* — Fletcher Yoder PC (57) ABSTRACT

Systems and methods are related to timesheet entries in a unified view. The system may include a processor that receives a selection of a task from a list of tasks, such as project tasks, scrum tasks, incidents, or problems, displayed in a first portion of a unified view. The processor generates a timesheet entry based on the task selected. The processor displays the timesheet entry in a list of timesheet entries in a second portion of the unified view. The processor receives an input that indicates an amount of time on the at least one day of the timesheet entry. The processor determines a total amount of time based on the amount of time entered on the timesheet entry on the at least one day. The processor displays the total amount of time entered in each day in a third portion of the unified view.

13 Claims, 7 Drawing Sheets

(56) References Cited

U.S. PATENT DOCUMENTS

| | | |
|---|---|---|
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,497,267 B1* | 11/2016 | Hoarau ............... H04L 67/1095 |
| 9,501,751 B1* | 11/2016 | Holler .................... G06Q 10/06 |
| 9,535,737 B2 | 1/2017 | Joy |
| 9,582,135 B2* | 2/2017 | Holler .................. G06F 3/0482 |
| 9,792,387 B2 | 10/2017 | George |
| 10,101,972 B1* | 10/2018 | Nelson ................... G06Q 10/06 |
| 2002/0055868 A1* | 5/2002 | Dusevic ............ G06F 17/30873 |
| | | 705/7.13 |
| 2003/0046135 A1* | 3/2003 | Cartwright ........... G06Q 10/063 |
| | | 705/7.17 |
| 2004/0085369 A1* | 5/2004 | Mak ...................... G06F 3/0482 |
| | | 715/864 |
| 2005/0049903 A1* | 3/2005 | Raja ...................... G06Q 10/10 |
| | | 705/32 |
| 2007/0006126 A1* | 1/2007 | Calkins .................. G06Q 10/06 |
| | | 717/103 |
| 2007/0282721 A1* | 12/2007 | Ducolon ............ G06Q 10/1091 |
| | | 705/32 |
| 2010/0023385 A1* | 1/2010 | Galvan .................. G06Q 10/06 |
| | | 705/7.42 |
| 2011/0289475 A1* | 11/2011 | Sukhenko ................ G06F 8/20 |
| | | 717/103 |
| 2012/0016701 A1* | 1/2012 | Narendra ............... G06Q 10/06 |
| | | 705/7.11 |
| 2012/0060155 A1* | 3/2012 | Keys ...................... G06F 9/541 |
| | | 718/100 |
| 2012/0109795 A1* | 5/2012 | Sutherland ............. G06Q 10/06 |
| | | 705/32 |
| 2013/0111277 A1* | 5/2013 | Klemenz ............. G06F 11/3664 |
| | | 714/57 |
| 2013/0124605 A1* | 5/2013 | Klaka .................... G06Q 10/10 |
| | | 709/203 |
| 2013/0297468 A1* | 11/2013 | Hirsch ................... G06Q 40/00 |
| | | 705/32 |
| 2014/0114715 A1* | 4/2014 | Kavanagh ...... G06Q 10/063114 |
| | | 705/7.15 |
| 2015/0019658 A1* | 1/2015 | Barrera ................... H04L 51/16 |
| | | 709/206 |
| 2015/0046207 A1* | 2/2015 | Hurd ................ G06Q 10/06313 |
| | | 705/7.17 |
| 2015/0081486 A1* | 3/2015 | Niazi .................... H04L 51/046 |
| | | 705/32 |
| 2015/0234996 A1* | 8/2015 | Wartena ............... G06F 19/3418 |
| | | 434/236 |
| 2015/0379455 A1* | 12/2015 | Munzer .......... G06Q 10/063114 |
| | | 705/7.15 |
| 2016/0065626 A1* | 3/2016 | Jain ................... G06F 17/30873 |
| | | 709/205 |
| 2016/0217422 A1* | 7/2016 | Dujisin ................. G06Q 10/103 |
| 2016/0239612 A1* | 8/2016 | Barry .................. G06F 19/3481 |
| 2016/0277536 A1* | 9/2016 | Barry .................... H04L 67/327 |
| 2016/0364670 A1* | 12/2016 | Lin .................. G06Q 10/06316 |
| 2016/0364675 A1* | 12/2016 | Sharma .......... G06Q 10/063114 |
| 2017/0061348 A1* | 3/2017 | Mack .............. G06Q 10/06313 |

* cited by examiner

| < ≡ INC0000025 | | ∅ ✓ ≡ ... FOLLOW ▽ UPDATE DELETE |
|---|---|---|
| | NUMBER | INC0000025 |
| | *STORY | PERFORMANCE ANALYTICS REPORTS — 330 |
| | PRIORITY | 4-LOW |
| | ACTUAL HOURS | |
| | CONTENT TYPE | PHONE — 410 |
| | STATE | IN PROGRESS — 412 |
| | IMPACT | 1-HIGH |
| | URGENCY | 1-HIGH |
| | PRIORITY | 1-CRITICAL — 330 |
| | ASSIGNMENT GROUP | 🔍 |
| | ASSIGNED TO | TROY MCCOY(TEAM MEMBER) 🔍 — 414 / 416 |

334

SHORT DESCRIPTION  TODO...
DESCRIPTION
WORK NOTES

ACTIVITY                                                          POST

👤 SYSTEM ADMINISTRATOR                           2017-01-15 09:07:16
    ASSIGNED TO SYSTEM ADMINISTRATOR

👤 SYSTEM ADMINISTRATOR                           2017-01-15 09:06:56
    OPENED BY SYSTEM ADMINISTRATOR

UPDATE DELETE
RELATED LINKS
STORY PROGRESS BOARD
TASK PROGRESS BOARD

USER INTERFACE FOR TIMESHEET REPORTING

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In various industries, time spent on various tasks may be tracked using various timesheet systems. For example, some projects may include one or more tasks which are allocated a certain amount of time to complete. A user may enter into the timesheet system the amount of time that the user has spent on that particular task. By tracking the amount of time that users spend on various tasks, the timesheet system may provide reports and other information to identify bottlenecks, delays, or other issues in the project that may cause issues. However, timesheet systems may be difficult to use and may not provide the desired information to enable the user to fill in the timesheet data in an efficient manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure are directed to a timesheet entry system for tracking time spent on certain tasks of projects and/or other activities, such as customer incidents, problems, meetings, and trainings. For example, the work performed by the user (e.g., project work, operational work, etc.) may be visible at one place for the user to log time with ease. The timesheet system may include a unified view on a user interface that displays potential tasks to be performed in a first portion of the unified view and displays timesheet entries having time spent on one or more of the potential tasks. By displaying tasks assigned to a certain user or group of users to be performed on the same view as the timesheet entries, the timesheet system may allow for less loading and unloading of data to be displayed while time is being entered. Further, the unified view of the user interface may include a timesheet summary that summarizes the timesheet entries. For example, the timesheet summary may provide a total amount of hours worked on a given day or date. In some embodiments, the processor may generate a timesheet policy to manage one or more timesheets from one or more users. For example, the timesheet policy may limit hours per day, limit hours per week, and define who approves project and/or non-project time.

The timesheet system includes a processor that receives a selection of a task from a list of tasks displayed in a first portion of a unified view. The list of tasks may be associated with a user of the timesheet system. For instance, the list of tasks may be work assigned to the user. The processor may generate a timesheet entry based on the task selected. The processor may send signals to a display to display the timesheet entry in a list of timesheet entries in a second portion of the unified view. The processor may receive an input that indicates an amount of time on the at least one day of the timesheet entry and determine a total amount of time based on the amount of time entered on the timesheet entry on the at least one day. The processor may then display the total amount of time entered in a third portion of the unified view.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Aspects of the present disclosure describe timesheet entry systems that may be used to manage time spent on tasks for various projects. While projects are used as an example throughout this disclosure, the timesheet entry system may manage time spent on other maintenance (e.g., operational work) such as incident, problems, and meetings, among others. The timesheet entry system may provide visibility into any of the work that a user may perform in the same place. Projects may include one or more tasks that may be assigned to one or more users. To manage a project, a timesheet may be used to track time that a user spends on each task. As tasks are accomplished, the user may move on to other tasks. By tracking the amount of time that the user spends on a typical task, the timesheet entry system may provide estimates and/or historical data regarding how much time the user spends completing each of these tasks. Further, the timesheet entry system may further provide insight into the amount of time the project may take to complete. However, a processor of the timesheet system may load and unload screens to generate a timesheet, which may be inefficient. For example, timesheet systems may display the tasks associated with a user on a first screen and the tasks associated with time that the user spent on a second screen. As such, the processor may spend additional processing to transition between the screens which may reduce performance, thereby reducing performance of the system.

Embodiments of the present disclosure include a processor that sends signals to the display to display a unified view that includes a list of tasks associated with an account as well as a list of timesheet entries of time associated with one or more of the tasks. Further, in some embodiments, the processor may display a timesheet summary in the unified view that includes a total amount of time spent on each of the tasks for each day accounted for in the timesheet.

Figure 1:
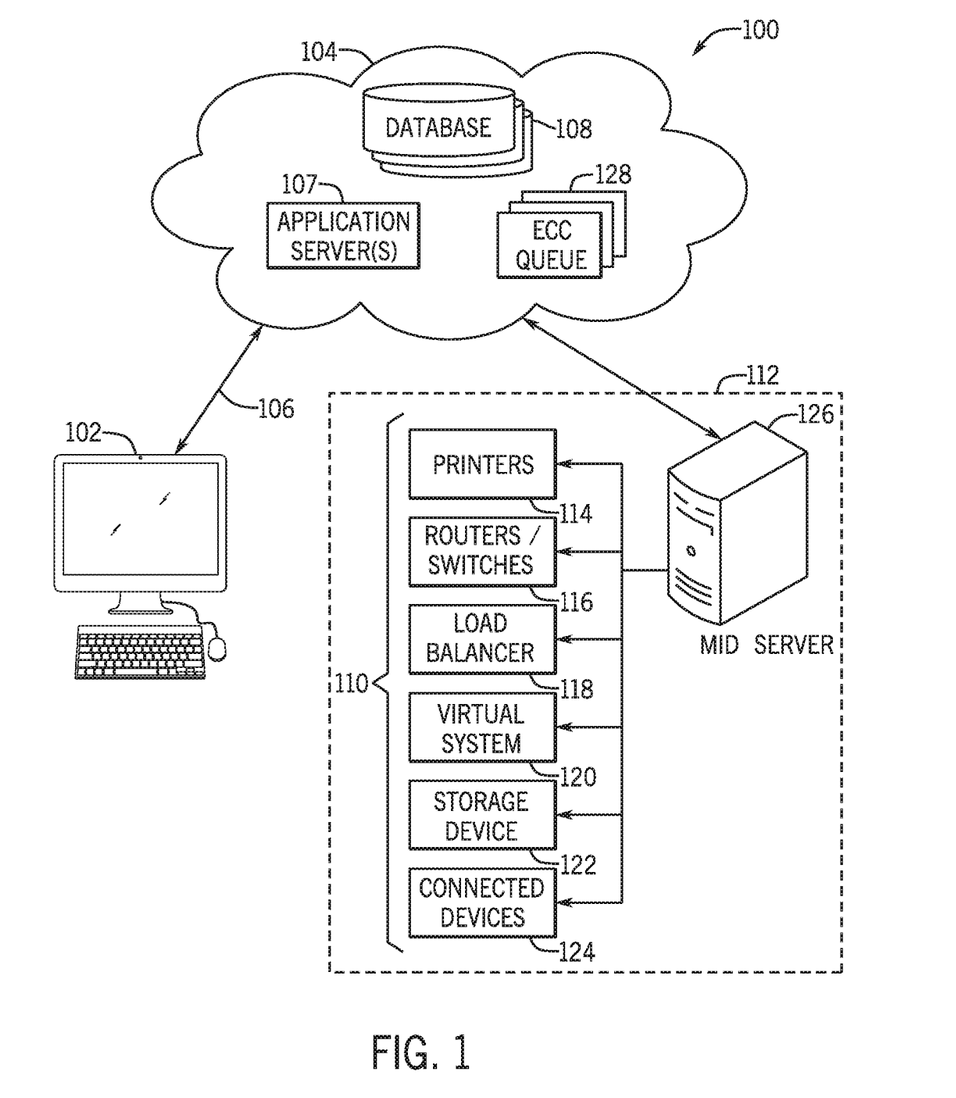
FIG. 1 is a block diagram of a distributed computing system used in performing a release, in accordance with aspects of the present disclosure.

By way of introduction to the present concepts and to provide context for the examples discussed herein, FIG. 1 is a block diagram of a system 100 that utilizes a distributed computing framework, which may be used perform one or more of the techniques described herein. As illustrated in FIG. 1, the distributed computing framework may include a client 102 that communicates with a platform 104, such as a cloud service platform, over a communication channel 106. The client 102 may include any suitable computing system and may include client application programs that run on the respective computing system. Although only a single client 102 is shown connected to the platform 104, it should be noted that platform 104 may connect to multiple clients (e.g., tens, hundreds, or thousands of clients).

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104.

Through the platform 104, the client 102 may connect to various devices running application programs on one or more nodes or other devices that may be accessed via the platform 104. For example, the client 102 may connect to an application server 107 and/or one or more databases 108 via the platform 104. The application server 107 may include any computing system capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables having information about assets and services controlled by the client 102 which may be used by one or more of the processed described herein. By way of example, in some instances a database 108 may store information about assets and services such as configuration items (CIs) 110 on a network 112 (or group of networks). The CIs 110 may include hardware resources, software resources, virtual resources, and/or storage constructs. For example, the illustrated embodiment of the CIs 110 includes printers 114, routers/switches 116, load balancers 118, virtual systems 120, storage devices 122, and/or other connected devices 124. In the depicted topology, access to the CIs 110 from the platform 104 is enabled via a management, instrumentation, and discovery (MID) server 126 via a communication channel, such as an external communications channel queue 128, though in other implementations the MID server may be absent.

As discussed herein processes and/or routines associated with the present approach may be performed on the one or more of the above-mentioned devices, nodes, or platforms.

Figure 2:
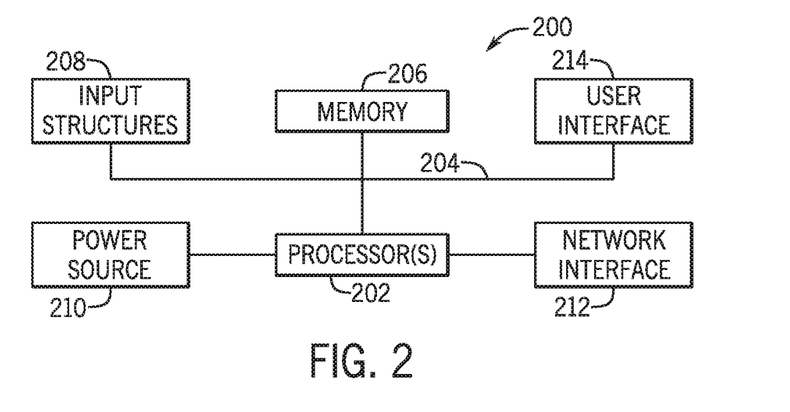
FIG. 2 is a block diagram of a computing device in the distributed computing system of FIG. 1, in accordance with aspects of the present disclosure.

With respect to the various computing devices noted above may include one or more of the computer components as depicted in FIG. 2. FIG. 2 generally illustrates a block diagram of example components of a computing device 200 and their potential interconnections or communication paths. As briefly mentioned above, the computing device 200 may be an embodiment of the client 102, the application server 107, a database server (e.g., databases 108), other servers or processor-based hardware devices present in the platform 104 (e.g., server hosting the communication queue 128), a device running the MID server 126, and/or any of the CIs. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components, such as, but not limited to, one or more processors 202, one or more busses 204, memory 206, input structures 208, a power source 210, a network interface 212, a user interface 214, and/or other computer components useful in performing the functions described herein. The one or more processors 202 may include processor capable of performing instructions stored in the memory 206. For example, the one or more processors may include microprocessors, system on a chips (SoCs), or any other circuitry performing functions by executing instructions stored in the memory 206 or another accessible location. The one or more busses 204 include suitable electrical channels to provide data and/or power between the various components of the computing device. The memory 206 may include any tangible, non-transitory, and computer-readable storage media. The input structures 208 provide structures to input data and/or commands to the one or more processor 202, such as a positional input device, such as a mouse, touchpad, touchscreen, and/or the like. The power source 210 can be any suitable source for power of the various components of the computing device 200. A network interface 212 is also coupled to the processor 202 via the one or more busses 204 and includes one or more transceivers capable of communicating with other devices over one or more networks (e.g., the communication channel 106). Further, a user interface 214 may include a display that is configured to display images transferred to it from the one or more processors 202. As described in detail below, the processor 202 may generate a worker portal. The worker portal may be the user interface 214 that displays a view in which any type of project task or other task associated with the user (e.g., a worker) may be selected for time to be entered in the same user interface 214.

With the preceding in mind, the one or more processors 202 of the computing device 200 may be used to execute routines that facilitate reporting time associated with tasks of a project, i.e., implementing a timesheet system (e.g., timesheet software application). For example, a project may have a task to be completed within a certain amount of time. By monitoring the amount of time spent on the task, the project may be managed to account for delays in working on the task or longer amounts of time spent on certain tasks. Further, it may be beneficial to provide both the list of tasks as well as the timesheet entries in a unified view to allow for efficient entries of time.

Figure 3:
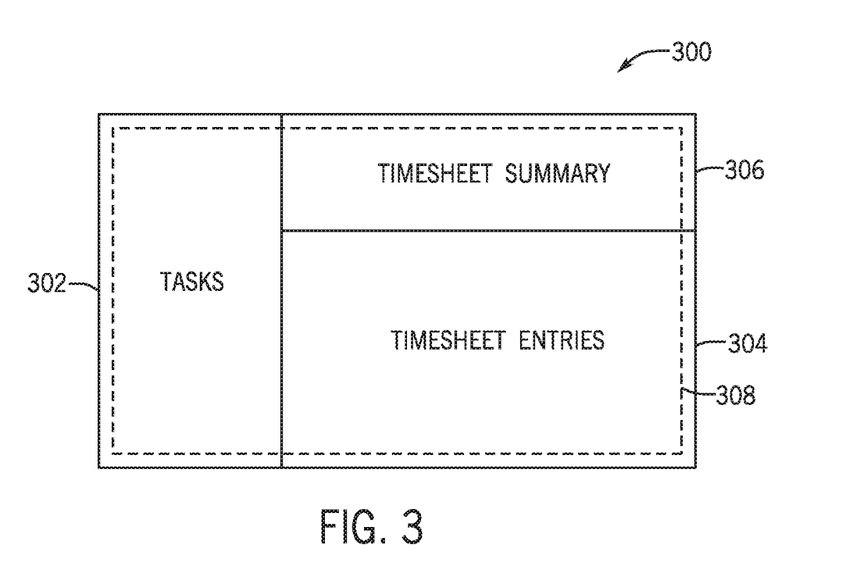
FIG. 3 is a block diagram of a user interface for managing timesheet data, in accordance with an embodiment of the present disclosure.

FIG. 3 is a block diagram of a user interface 300 to manage timesheets in a timesheet system. The user interface 300 may include a list of tasks 302 assigned to a user or a group of users. For example, a software developer may be assigned one or more tasks that may be associated with a project to develop a software application. The user interface 300 may include each of the timesheet entries 304 that indicate time spent by the software developer to perform one or more of the tasks 302. Further, the user interface 300 may include a timesheet summary 306 that provides a summary of the time entered. A unified view 308 may include the list of tasks 302 in a first portion of the unified view 308, timesheet entries 304 in a second portion of the unified view 308, and the timesheet summary 306 in a third portion of the unified view 308. By having the unified view 308 of information specific to the software developer (e.g., tasks associated with the software developer, timesheet entries associated with the software developer, timesheet summary for the timesheet entries of the software developer, etc.), fewer loading and unloading of the data for the software developer may be performed.

In some embodiments, the processor 202 may identify a CI represented in the CMDB as having an error from a discovery probe of the MID server 126. The processor 202 may generate a task associated with the error and assign the task to the user. The processor 202 may then update the list of tasks 302 to include the tasks associated with the error.

Figure 4:
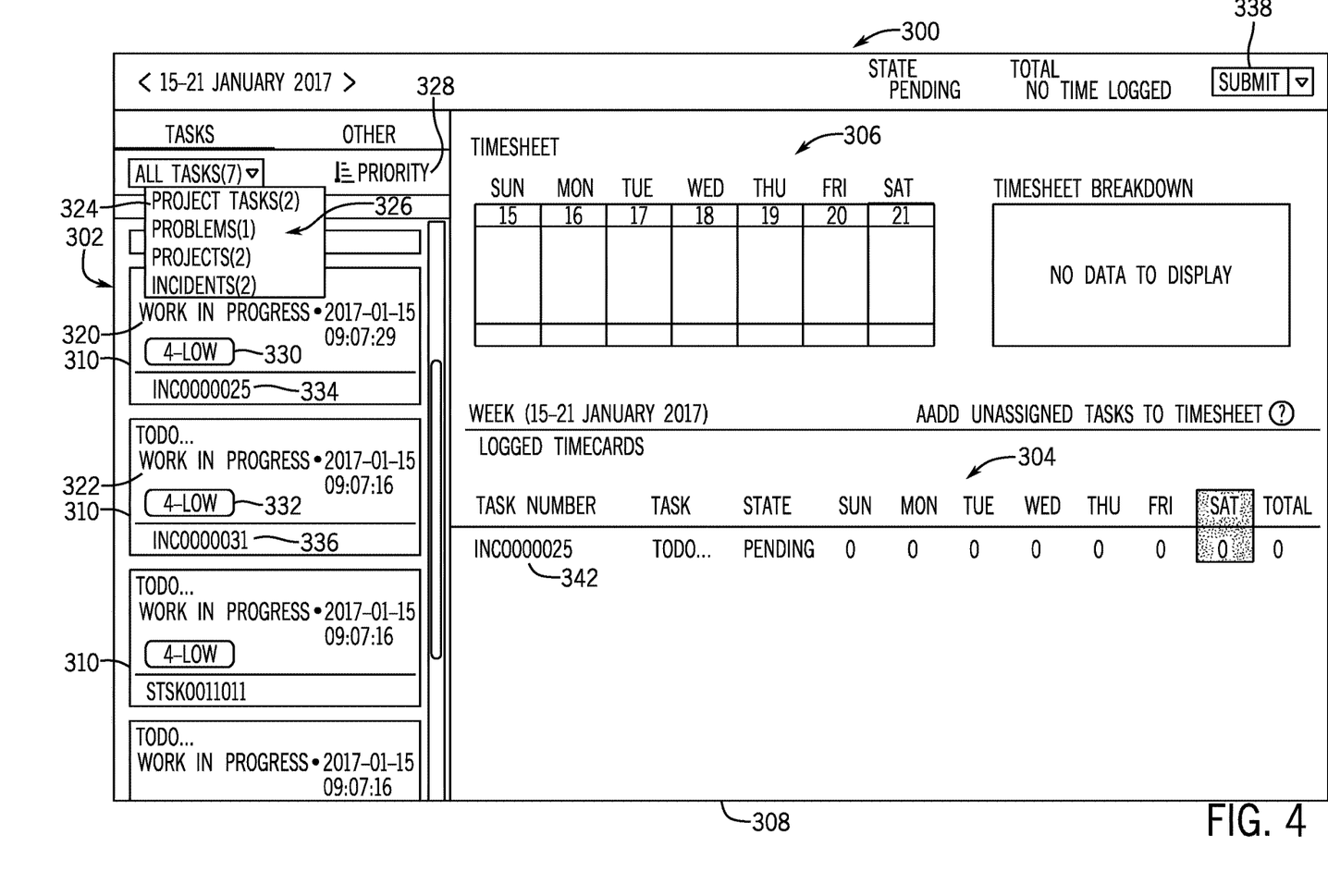
FIG. 4 is an example of a screenshot of a user interface for managing timesheet data, in accordance with an embodiment of the present disclosure.

FIG. 4 is an example of a screenshot of a user interface 300 that has a unified view 308 of cards 310 of tasks 302 assigned to the user or group of users as well as the timesheet entries 304 of the tasks 302 performed by the user or a group of users during a week. Further, the user interface 300 includes a timesheet summary 306 that has total amount of hours spent on the tasks 302 in each day of the week. While a week timeframe is used in the illustrated embodiment as an example, any suitable timeframe may be used. In the illustrated embodiment, the unified view 308 includes a first task 320 and a second task 322. The tasks 302 may be automatically assigned based on pre-defined conditions and/or assignment rules, or the tasks 302 may be assigned by another user as part of managing a project. Further, the pre-defined conditions and/or assignment rules may be generated based on prior rules created.

In the illustrated embodiment, a combination of tasks (e.g., project tasks, scrum tasks, problems and/or incidents coming from the usage of existing systems, projects, etc.) assigned to the user are shown in the list of tasks 302, however, the user interface 300 may display project tasks 324 or other tasks 326 (e.g., problems, projects, incidents, scrum tasks, etc.) separately. For instance, the processor 202 may generate problems and/or incidents which may appear on the list of tasks 302 when a client runs into some issues on a system and the issues are assigned to the user. Scrum tasks may refer to tasks that are performed according to an agile development methodology in which iterative cycles (e.g., sprints) are performed to complete a project. The scrum tasks may be generated from stories of the iterative cycles. Further, as the agile development project changes, the scrum tasks may be updated based on changes to the agile development project. The tasks 302 may be displayed in order based on a respective task priority 328. For example, the tasks 302 may be displayed from highest priority to lowest priority or from lowest priority to highest priority.

The tasks 302 may be associated with a dynamic workflow. For example, the processor 202 may allow the implementation of dynamic workflows that send different sets of instructions to different user interfaces of different users based on a change in the status of one member of the enterprise. That is, after receiving an indication that a role of a member of an enterprise is changing or a new member is being added to the enterprise, the server system may dynamically determine different activity sets that detail different activities for different users to perform for different departments based on the information available on the databases associated with the different departments and the indication. For instance, upon adding a new user, the processor 202 may re-assign the tasks 302 associated with the dynamic workflow to various users to redistribute the workload.

In some embodiments, the list of tasks 302 may be updated based on changes to project workflows in project management tools of the timesheet system. For instance, the processor 202 may generate a task of a project in performing the project. In this example, a user may assign a task to fix a bug to a software developer as part of completing the project, and the added task may be displayed in the list of tasks 302 while a software developer enters their timesheet.

In the illustrated embodiment, each card 310 of the tasks 302 may include a priority 330 and 332 and a task number 334 and 336 associated with the respective task 320 and 322. Further, as mentioned above, the processor 202 may display the cards 310 of tasks 302 associated with an account (e.g., a user or a group of users). The cards 310 may provide a high level description of the respective task 302. The user may be expected to perform the tasks 302 in a project. Additionally, other tasks that are not project tasks 324 or scrum tasks may be included to enable the user or group of users to enter time regarding tasks 302 that are not associated with projects, such as administrative tasks, meetings, out of office tasks, or training, among others. The timesheet entries 304 may include one or more tasks 342 having time entered against the task over a period of time (e.g., month, week, or day). The unified view 308 may enable the user to add time associated with the tasks 302 in the same view.

The timesheet (i.e., each of the timesheet entries of FIG. 4) may group each of the cards 310 entered into the timesheet entries 304 associated with the user for a given week. The timesheet may then be submitted for approval via the submit button 338. The processor 202 may send the timesheet to an approver to be reviewed and approved. In some embodiments, the processor 202 may send a notification (e.g., email, internal message, text message, voicemail, etc.) indicating that there is a timesheet to be approved.

Figure 5:
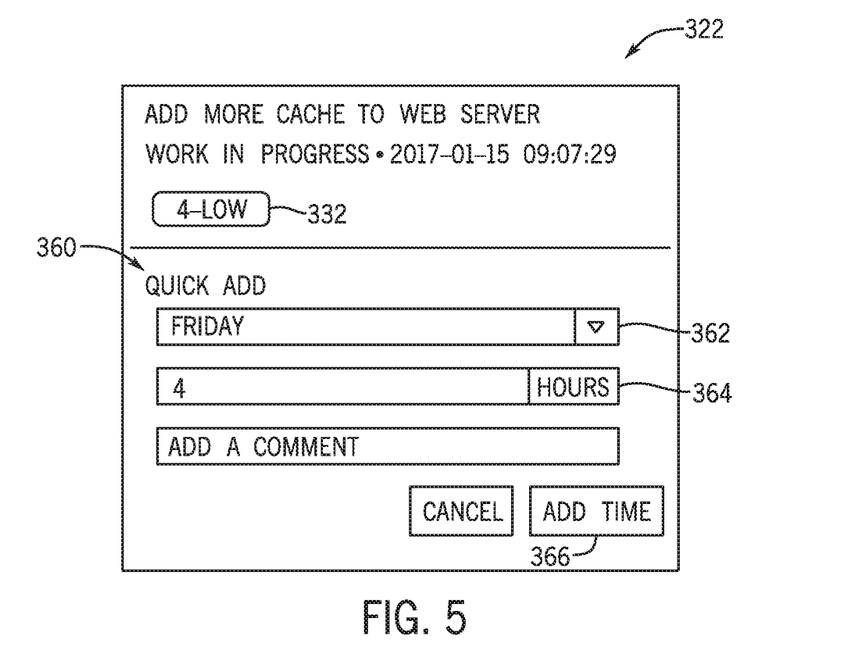
FIG. 5 is an example of a screenshot of a menu to enter time of a task in the user interface of FIG. 4, in accordance with an embodiment of the present disclosure.

FIG. 5 is a screenshot of a time add menu 360 that may be generated upon selection of the task 322 to enable the user to add a timesheet entry to the list of timesheet entries 304. The time add menu 360 may be an expanded menu or a pop-up menu that enables timesheet entry information to be entered on the card 310 of the task 322 of FIG. 4. The time add menu 360 may include a drop down of a day 362 to include in the timesheet entry to be added as well as an amount of time 364 (e.g., hours, minutes, etc.) to be associated with the day and the task 322. Upon receiving a selection confirming the time to add (e.g., via button 366), the processor 202 may generate a timesheet entry indicating the day 362 and the amount of time 364 associated with the day 362 and the task 322.

Figure 6:
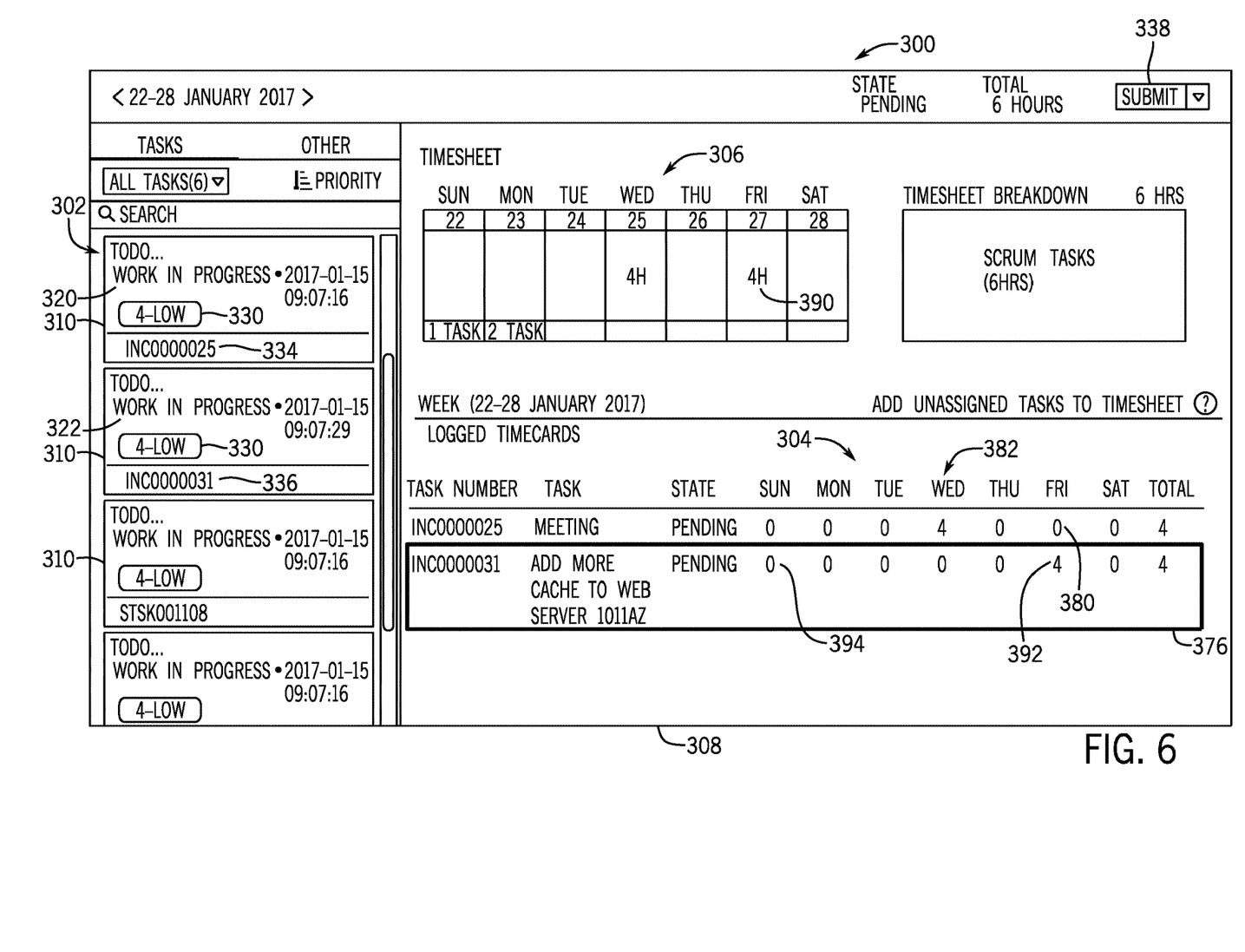
FIG. 6 is an example of a screenshot of the user interface of FIG. 4 having an added timesheet entry, in accordance with an embodiment.

FIG. 6 is a screenshot of the user interface 300 updated to include a timesheet entry 376 added to the list of timesheet entries 304. The processor 202 may generate the timesheet entry 376 that includes one or more amounts of time 380 associated with the day 382 or date and the task 322 (e.g., task number INC000031). The processor 202 may then determine a total amount of time based on the amount of time 380 entered on the timesheet entry 376 on each day 382. The processor 202 may display the total amount of time 390 entered in each day 382 in the timesheet summary 306 of the unified view 308 in the user interface 300. For example, on Wednesday, the time 380 and the time 392 may be summed and displayed as the total amount of time 390. The processor 202 may receive a selection of another time 394 of the timesheet entry 376 to allow the user to enter additional time information into the timesheet entry 376. That is, the unified view 308 of the user interface 300, or a view that includes both the tasks 302 associated with a user as well as the timesheet entries 304 with each of the tasks performed by the use, may allow the processor 202 to perform fewer screen transitions (e.g., loading and/or unloading of user interface screens) to generate timesheet entries and summaries. Additionally, the unified view 308 may provide the timesheet summary 306 information to further reduce the number of screens that the processor 202 generates.

Upon entering the timesheet entry 376, the processor 202 may then receive a selection of another task 320 from the user interface 300 without loading and/or unloading tasks 302. That is, the unified view 308 may allow the processor 202 to generate the timesheet in an efficient manner by allowing selection of tasks 302 relevant to the user as well as inputting time regarding the tasks 302. In some embodiments, the unified view 308 may be provided dynamically in which the processor 202 updates the timesheet data as the timesheet entries are generated.

Figure 7:
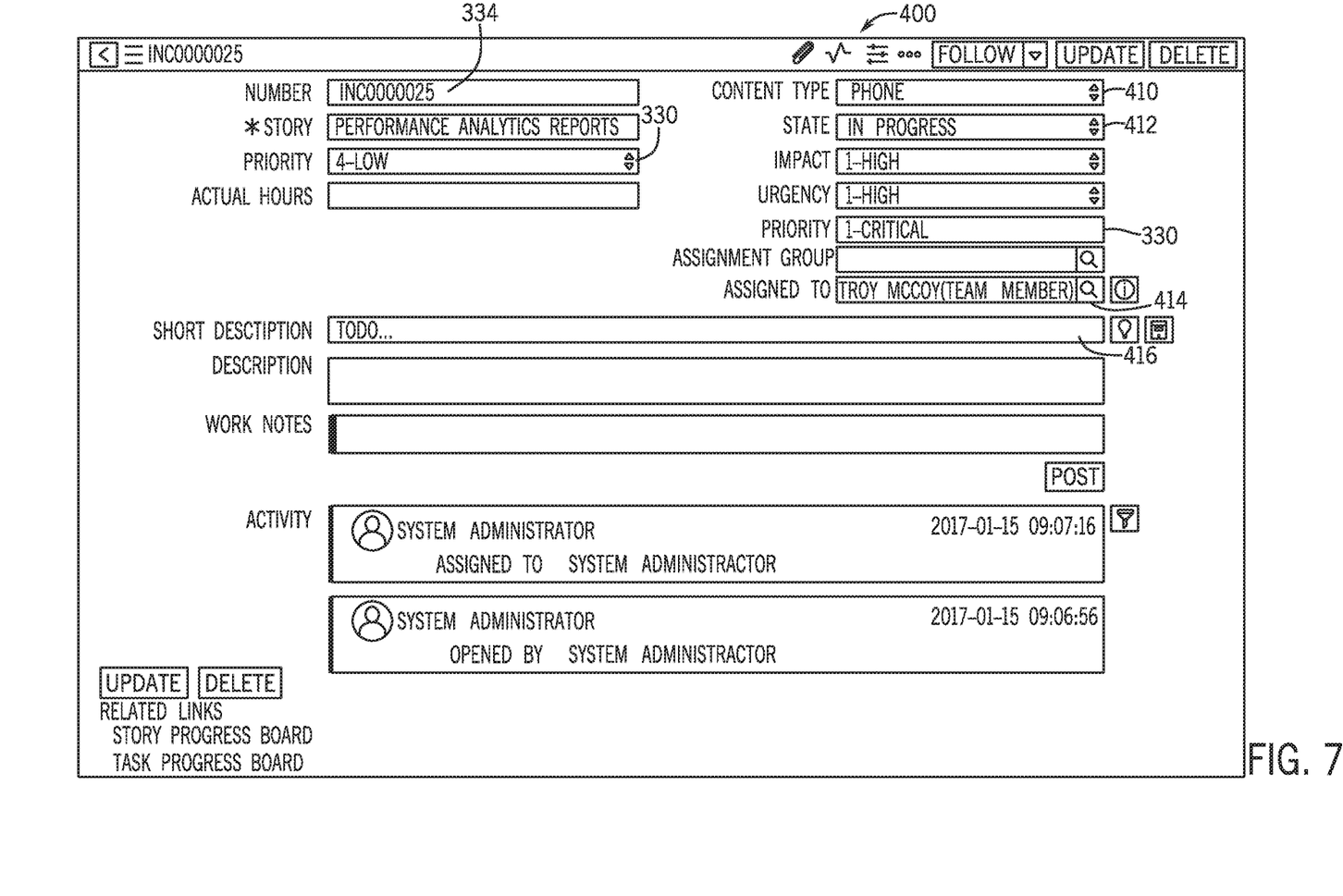
FIG. 7 is an example of a screenshot of a user interface that includes details of a specific task, in accordance with an embodiment.

FIG. 7 is an example of a screenshot of a user interface 400 that includes details of a specific task 320 from FIG. 6. The processor 202 may receive a selection of the task number 334 and generate a detailed description of the task 320. That is, the processor 202 may provide cards 310 that provide a higher level description of the task 320 on the unified view 308 and provide lower level details regarding the task 320 in the separate screen. For example, the lower level details may include a type 410, a state 412, an assigned to field 414, and a detailed description 416, among others.

Figure 8:
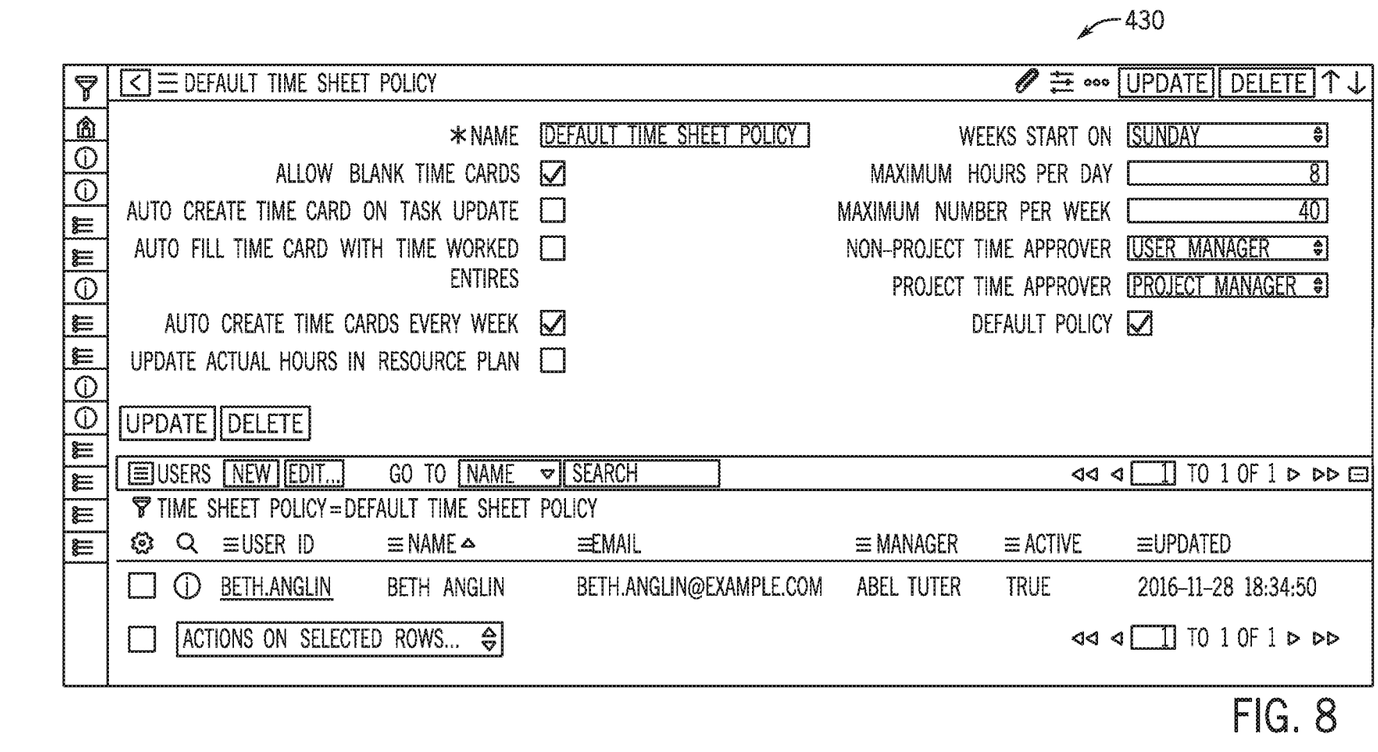
FIG. 8 is an example of a screenshot of a user interface to generate a timesheet policy, in accordance with an embodiment.

FIG. 8 is an example of a screenshot of a user interface 430 to generate a timesheet policy. The processor 202 may apply the timesheet policy to one or more timesheets. For example, the processor 202 may generate a timesheet policy to manage one or more timesheets from one or more users. For instance, the processor 202 may apply the timesheet policy to one or more timesheets to limit hours per day, limit hours per week, and define who approves project and/or non-project time. As an example, upon receiving a submission of a timesheet via the submit button 338 illustrated in FIG. 4, the processor 202 may adjust a state of the timesheet to a pending state. Upon receiving approval from a user designated to approve timesheets according to the timesheet policy, the processor 202 may adjust the state of the timesheet to an approved state. If the approver sees an issue with the timesheet, the user designated to approve timesheets according to the timesheet policy may adjust the state of the timesheet to a rejected state. Further, the processor 202 may limit the users who have authority to add or edit timesheets. Additionally and/or alternatively, the processor 202 may apply different timesheet policies to different timesheets based on the users, the tasks, the projects, or the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
one or more hardware processors configured to execute instructions stored in a non-transitory memory to cause the system to perform operations comprising:
generating a total available time for each of a plurality of time periods to perform a plurality of tasks associated with a dynamic workflow;
receiving, via a first user interface, a selection of a task from a list of tasks of the plurality of tasks associated with the dynamic workflow displayed in a first portion of a unified view of the first user interface;
receiving a time input associated with the task selected, wherein the time input comprises an amount of time and a time period of the plurality of time periods;
in response to receiving the selection of the task and the time input, generating a timesheet entry based on the selection of the task and the time input;
displaying the timesheet entry in a list of timesheet entries in a second portion of the unified view of the first user interface, wherein the timesheet entry in the list of timesheet entries comprises the amount of time and the time period;
determining a total amount of time based on the amount of time of the timesheet entry for the time period;
displaying the total amount of time for the time period in a third portion of the unified view, wherein the first portion of the unified view, the second portion of the unified view, and the third portion of the unified view are configured to be viewed via the first user interface simultaneously and to be updated automatically in response to receiving the selection of the task and the time input;
receiving an indication of a role change associated with the dynamic workflow, wherein the role change comprises an addition of a new user;

displaying a first set of instructions via the unified view of the first user interface;

sending a second set of instructions different from the first set of instructions to a second user interface associated with the new user based at least in part on the role change to the dynamic workflow, wherein the first set of instructions, the second set of instructions, or both comprise a redistribution of the list of tasks displayed to the first user interface, the second user interface, or both;

redistributing the list of tasks based on the total available time in each of the plurality of time periods;

receiving an indication of an error via a discovery probe;

generating a new task based on the indication of the error; and assigning the new task to a user such that the new task is displayed in the list of tasks on the first portion of the unified view of the first user interface.

2. The system of claim 1, wherein the list of tasks displayed in the first portion of the unified view comprises project tasks, scrum tasks, incidents, problems, enhancements, or any combination thereof.

3. The system of claim 1, wherein the one or more hardware processors are configured to execute instructions from the non-transitory memory to cause the system to perform operations comprising displaying a higher level description of each task in the list of tasks in the unified view.

4. The system of claim 1, wherein the one or more hardware processors are configured to execute instructions from the non-transitory memory to cause the system to perform operations comprising displaying a lower level detailed description of a selected task in a separate view from the unified view, wherein each task in the list of tasks displays a higher level description in the unified view.

5. The system of claim 3, wherein the one or more hardware processors are configured to execute instructions from the non-transitory memory to cause the system to perform operations comprising sending a notification indicating that a timesheet has been submitted upon submission of the timesheet.

6. The system of claim 1, wherein the one or more hardware processors are configured to execute instructions from the non-transitory memory to cause the system to perform operations comprising applying a timesheet policy to a timesheet to limit entries into the timesheet, wherein the timesheet comprises each of the list of timesheet entries.

7. A non-transitory, computer readable medium comprising instructions for a timesheet system, wherein the instructions are configured to be executed by a processor to perform operations comprising:

generating a total available time for each of a plurality of time periods to perform a plurality of tasks associated with a dynamic workflow;

receiving, via a first user interface, a selection of a task from a list of tasks of the plurality of tasks associated with the dynamic workflow displayed in a first portion of a unified view of the first user interface;

receiving a time input associated with the task selected, wherein the time input comprises an amount of time and a time period of the plurality of time periods;

in response to receiving the selection of the task and the time input, generating a timesheet entry based on the selection of the task and the time input;

displaying the timesheet entry in a list of timesheet entries in a second portion of the unified view of the first user interface, wherein the timesheet entry in the list of timesheet entries comprises the amount of time and the time period;

determining a total amount of time based on the amount of time of the timesheet entry for the time period;

displaying the total amount of time for the time period in a third portion of the unified view, wherein the first portion of the unified view, the second portion of the unified view, and the third portion of the unified view are configured to be viewed via the first user interface simultaneously and to be updated automatically in response to receiving the selection of the task and the time input;

receiving an indication of a role change associated with the dynamic workflow, wherein the role change comprises an addition of a new user; and displaying a first set of instructions via the unified view of the first user interface;

sending a second set of instructions different from the first set of instructions to a second user interface associated with the new user based at least in part on the role change to the dynamic workflow, wherein the first set of instructions, the second set of instructions, or both comprise a redistribution of the list of tasks displayed to the first user interface, the second user interface, or both;

redistributing the list of tasks based on the total available time in each of the plurality of time periods;

receiving an indication of an error via a discovery probe;

generating a new task based on the indication of the error; and assigning the new task to a user such that the new task is displayed in the list of tasks on the first portion of the unified view of the first user interface.

8. The non-transitory, computer readable medium of claim 7, wherein the list of tasks is associated with a particular user of the timesheet system.

9. The non-transitory, computer readable medium of claim 7, wherein the instructions are configured to be executed by the processor to perform operations comprising sending a notification indicating that a timesheet has been submitted upon submission of the timesheet, wherein the timesheet comprises the timesheet entry.

10. The non-transitory, computer readable medium of claim 7, wherein the instructions are configured to be executed by the processor to perform operations comprising applying a timesheet policy to a timesheet to limit entries into the timesheet, wherein the timesheet comprises the timesheet entry.

11. The non-transitory, computer readable medium of claim 7, wherein the instructions are configured to be executed by the processor to perform operations comprising displaying a list of non-project tasks as the list of tasks.

12. The non-transitory, computer readable medium of claim 11, wherein the list of non-project tasks comprises administrative tasks, meetings, out of office tasks, training, or any combination thereof.

13. The system of claim 1, wherein the role change further comprises a deletion of an existing user of the system or a change to a role associated with the existing user.

* * * * *